Jan. 7, 1969   D. L. GEISELMAN   3,420,500
OPERATING MECHANISM FOR BUTTERFLY VALVE
Filed Oct. 31, 1966   Sheet 1 of 3

INVENTOR.
DONALD L. GEISELMAN
BY
ATTORNEY.

INVENTOR.
DONALD L. GEISELMAN
BY James E. Gudera
ATTORNEY.

INVENTOR.
DONALD L. GEISELMAN

ATTORNEY.

United States Patent Office 3,420,500
Patented Jan. 7, 1969

3,420,500
OPERATING MECHANISM FOR BUTTERFLY VALVE
Donald L. Geiselman, Bradford, Pa., assignor to Dresser Industries, Inc., Dallas, Tex., a corporation of Delaware
Continuation-in-part of application Ser. No. 513,772, Dec. 14, 1965. This application Oct. 31, 1966, Ser. No. 604,090
U.S. Cl. 251—288        8 Claims
Int. Cl. F16k 51/00; F16d 11/00; F16h 29/20

ABSTRACT OF THE DISCLOSURE

An operating mechanism for connection to a rotatable valve shaft which operates the valve between open and close positions. The mechanism includes a housing containing an externally driven lead screw threadedly supporting a follower which travels in response to driven screw rotation. The follower is operably connected to rotate the valve shaft during the course of its lead screw travel, while ends of the follower interlock with housing sockets at the end of travel to prevent over-torque being transmitted to the valve.

---

This application is a continuation-in-part of application Ser. No. 513,772, filed Dec. 14, 1965, now abandoned.

This invention relates to valves of the so-called butterfly type, and more particularly to improvements in the valve disc operating mechanism.

A butterfly valve is generally characterized by a valve body having an annular seat and a circular disc or vane which is rotatably mounted by a central cross-shaft. To open and close the valve, the cross-shaft is rotated through a driving mechanism which typically is manually operated from a remote point. To effect a mechanical advantage, prior art driving mechanisms have comprised various combinations of gearing and linkages. The need for remote operation of butterfly valves is common because a valve of this type often is installed on a pipeline buried in the ground at a considerable depth. At the remote operating location a means is provided to indicate to personnel the relative open or closed position of the valve. Despite such means, however, there is a human tendency on the part of the personnel, using the leverage available, to ignore a fully open or closed indication and to apply an extra measure of force which can severely damage the valve. A motion limiting means can be provided at some point in the drive train leading to the vane, but in a case of massive overloading, either this motion limiting means itself or the intermediary drive train generally will fail. Because the input shaft of a valve is relatively stronger than the valve parts, attempts have been made to apply motion limiting means directly to this shaft, but because this approach necessitates reduction gearing and the like in order to be operable, this is neither economically feasible nor completely satisfactory. In a mechanism having a driving screw and a nonrotatable threaded cross-head or follower, the previously known methods of limiting the length of travel of the follower have been unsatisfactory because the frictional forces generated at either end under overloading tended to force rotation thereof.

Accordingly, it is an object of this invention to provide an improved driving mechanism which can sustain massive overloading without damage and without transmitting any forces to the valve parts.

It is a further object of the invention to provide improved mechanism for maintaining the follower against rotation in its course of travel when contained in a valve as recited in said aforesaid object.

In accordance with this invention, driving motion is transmitted to the vane through an input screw and a threaded cross-head or follower which drives and is maintained against rotation intermediate in its course of travel by a slotted yoke on the vane cross-shaft. Between each end of the follower and the adjacent wall of the valve housing, a pair of meshing rotation preventing means is provided. More specifically, for example, in the embodiment of the invention disclosed herein, the ends of the follower are square in external cross-section and the opposite side walls of the housing are provided with square recesses into which the follower ends are movable. As the vane approaches a fully open or closed position, the follower moves into and meshes with a recess and is stopped thereby. All forces imposed due to further operation of the input screw will be resisted solely by the rugged meshing interlock between the follower and housing, and cannot be transmitted to the weaker valve parts. Because of this noncircular configuration and interlocking action, frictional resistance to the overload forces is not involved. By virtue of the construction just described, massive overloads in excess of 450 foot-pounds of torque have been sustained without damage to the drive mechanism or the valve parts.

Further objects, advantages and details will become apparent from the following description when read in conjunction with the accompanying drawings, in which.

Figure 1:
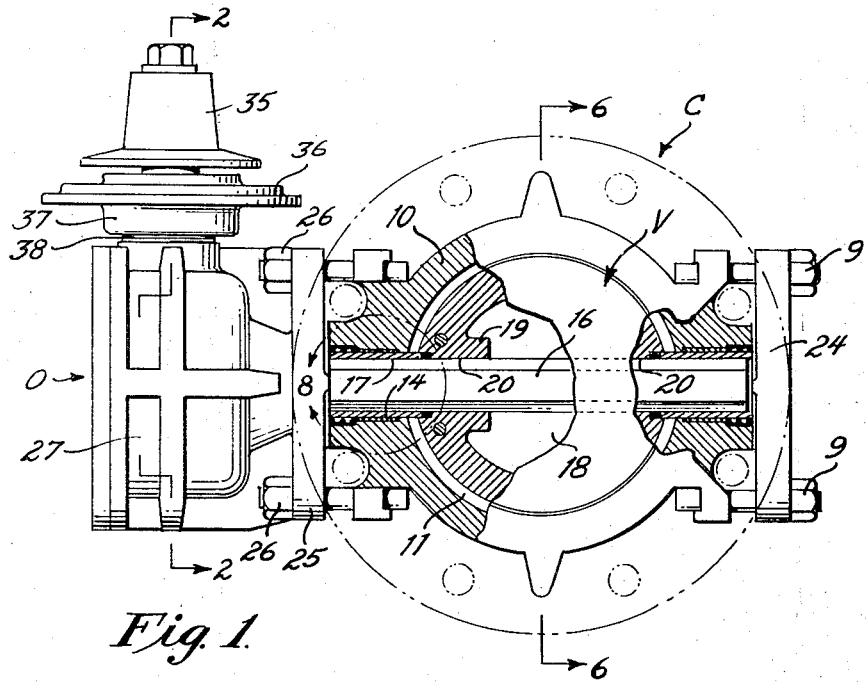
FIGURE 1 is an end view of the valve, with parts partially broken away and shown in section.

Referring now to the drawings and first more particularly to FIGURE 1, a valve housing or casing is therein illustrated and referred to generally by the reference character C. The housing C includes an annular wall 10 which is formed with a valve seat as shown at 11 in FIGURES 6 and 7. The seat proper is preferably defined by a stainless steel ring 12 which is cast into the wall 10. At diametrically opposite points with respect to seat 11, the housing 10 is formed with aligned cylindrical bores 13.

These bores 13 are sized to accommodate Teflon antifriction bearing sleeves 14. At their outer ends, the bores 13 are enlarged to provide counterbores 15. The main valve cross-shaft is designated 16, and is preferably of a noncircular formation throughout its entire length. The hexagonal cross-section shown is merely one example of a cross-section that may be employed. Carried by the ends of shaft 16 within the bores 13 are corrosion resistant bearing sleeves 17. Stainless steel is preferred as the material. At one side, the seal 23 is held in position by a noncircular central bore corresponding to the cross sectional shape of the shaft 16 which extends therethrough and which constitutes the driving connection between the shaft and the bearing sleeve. The outer surface of each stainless steel bearing sleeve 17 is cylindrical and is journaled in a Teflon sleeve 14.

Figure 6:
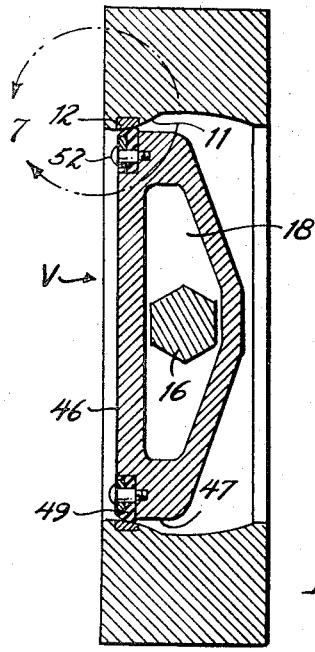
FIGURE 6 is a detailed section through the housing and the vane with the vane in closed position, this view taken as indicated by lines 6—6 in FIGURE 1.

The vane is referred to in its entirety by the reference character V. It includes a central cavity 18 through which the shaft 16 passes as shown in FIGURE 6. At each side, the vane V is formed with internal hub 19 as shown in FIGURE 1 and these hubs 19 are formed with noncircular bores 20 corresponding to the cross-section of the shaft 16 received therein, thus establishing a driving connection between shaft 16 and the vane V.

At the outer end of each bore 20, it is enlarged to provide a counterbore 21, it being noted that a bearing sleeve 17 extends partially into each such counterbore 21, and a static seal 22 is fitted within each counterbore 21. It is to be noted that there is no relative motion between sleeves 17, shaft 16, vane V, and static seals 22, and thus there is no wear to impair the effectiveness of sealing.

Positioned in each counterbore 15 is an outer seal 23 which may be of rubber or comparable elastomeric material. At one side, the seal 23 is held in position by a cover plate 24 that is anchored on the housing by bolts 9. The seal 23 on the other side is held in position in a similar manner by a base plate 25 associated with the valve operating mechanism and anchored to the housing C by bolts 26. These seals 23 prevent leakage of fluid from the interior of the housing.

Figure 4:
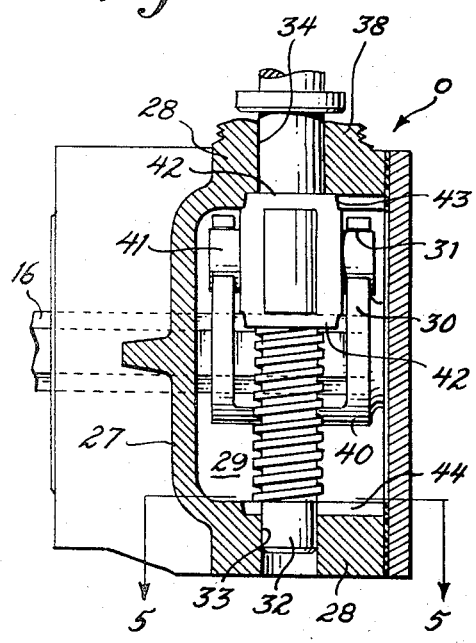
FIGURE 4 is another section through the operating mechanism taken on the plane represented by the lines 4—4 in FIGURE 2.
Figure 2:
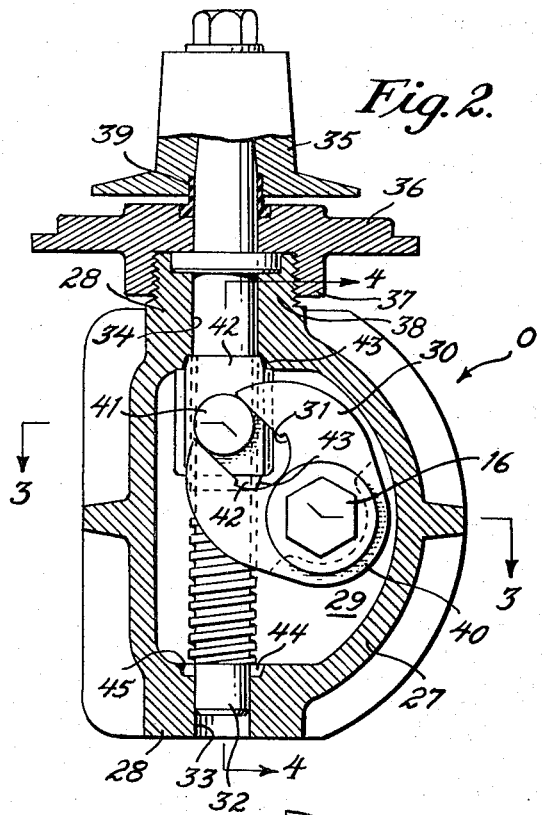
FIGURE 2 is a section through the operating mechanism, taken as indicated by lines 2—2 in FIGURE 1.
Figure 3:
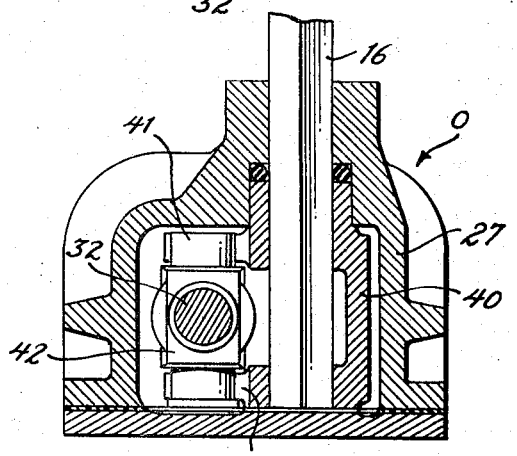
FIGURE 3 is a section through the operating mechanism taken normal to the showing of FIGURE 2 and about on the planes represented by lines 3—3 in FIGURE 2.
Figure 9:
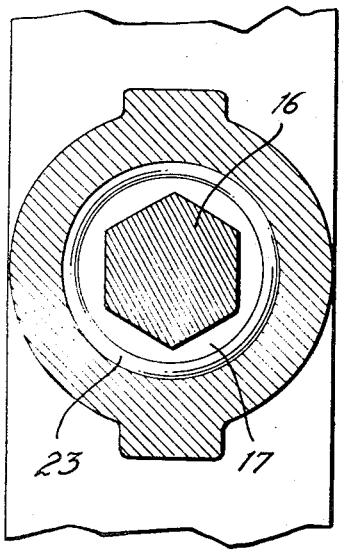
FIGURE 9 is a detailed cross-section taken as indicated by the lines 9—9 in FIGURE 8.
Figure 8:
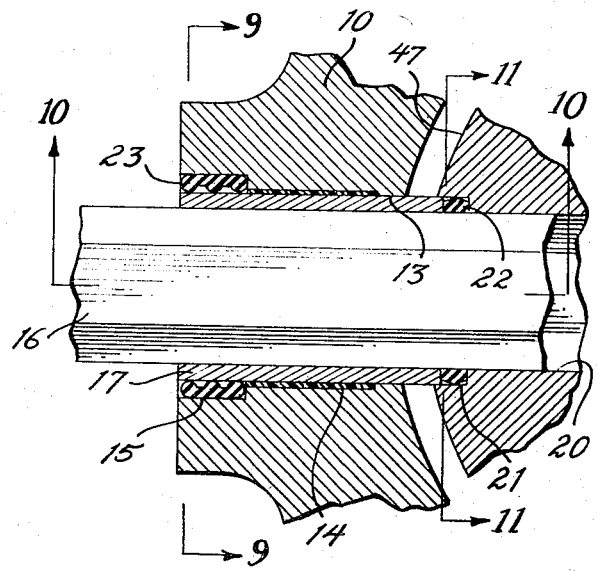
FIGURE 8 is an enlarged sectional view of that portion of the shaft which is journaled in the housing together with the bearing sleeves and associated seals.
Figure 11:
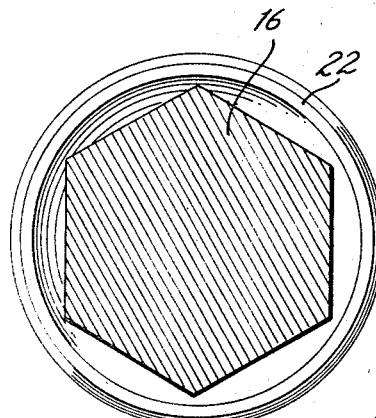
FIGURE 11 is still another detailed cross-section taken as indicated by the lines 11—11 in FIGURE 8.
Figure 10:
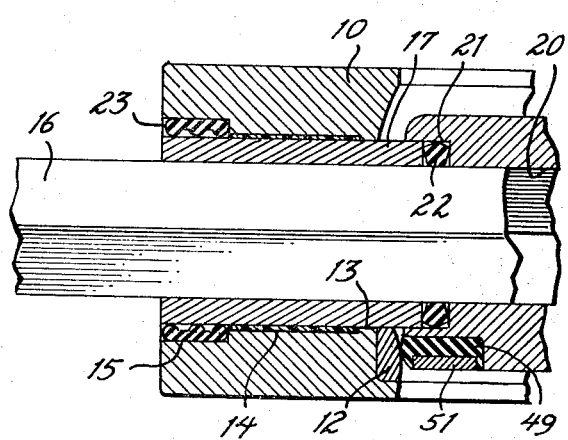
FIGURE 10 is another detailed axial section taken normal to the showing of FIGURE 9 and about on the plane represented by lines 10—10 in FIGURE 8.

Mounted on the base plate 25 is a housing 27 for the valve operating mechanism generally designated at O. (FIGURES 2, 3 and 4.) This housing defines a chamber 29 having end walls 28. Shaft 16 extends through the base plate 25 and into the chamber 29, where a bifurcated scotch yoke 30 is fixedly mounted thereon, the latter being formed with an open ended slot 31 and parallel spaced arms 60 and 61.

A threaded lead screw or stem 32 has its opposite ends journaled in bearings 33 and 34 in the opposite end walls and is secured against longitudinal movement along its axis in accordance with the invention hereof by means of a thrust collar 62 secured in counterbore 63 by means of closure plate 36. One end of stem 32 extends through the bearing 34 and carries a wrench engaging member 35. Closure plate 36 includes an internally threaded collar 37 that is screwed onto an externally threaded neck 38 formed on the housing, and a seal 39 is interposed between the plate 36 and wrench engaging member 35.

A threaded cross-head follower 40 is carried by stem 32, and it is evident that rotation of the stem 32 will effect axial travel of this cross-head 40 across the chamber 29. During such movement, the reception of the follower of the cam stud 41 in the slot 31 (FIGURE 2) transmits the movement to the yoke and in turn to shaft 16, while the flat top and bottom walls of the follower are received in continuous sliding contact against the inside flat surfaces of the yoke arms 60 and 61. This latter arrangement maintains the follower guided against rotation during the course of its movement to ensure accurate geometric alignment between the follower and valve body at the end of travel position as will be understood. Since only frictional forces of rotation need be overcome by the yoke arms against the follower, the arms are not subjected to excessive torque as the follower advances. However, when a limit of movement is reached and it is attempted to rotate the stem 32 further, the moving parts would in the absence of the invention hereof be subject to excessive torque which eventually could result in damage.

In accordance with this invention, meshing interlocking means are formed on the ends of the cross-head follower 40 and the housing walls. Note that each end of the follower 40 is in the form of a projection 42 having tapered side walls 43. The inner face of each of the end walls 28 is formed with a socket or recess 44 at the openings of bearings 33 and 34. These recesses 44 have inclined side walls 45 into which the projections 42 are adapted to be received. The recesses 44 and projections 42 are complementary; that is, each recess 44 is to a projection as a wrench is to a hexagonal or square nut. In the illustrated case each projection 42 is square and each recess 44 is rectangular so as to span the sides of a projection and interlock with it when the same advances to within the recess. Thus, when a limit of movement is reached as shown in FIGURE 2, the projection 42 at one end of the cross-head enters the recess 44 and any torque thereafter is taken by the housing. If the person operating the valve exerts very great torque on the stem after the vane has reached its fully open or closed position, the vane cannot be moved further and this torque cannot act either to rotate the cam stud 41 out of the slot 31 nor to otherwise damage the driving mechanism.

Although in the above illustrated embodiment of the invention the wrench engaging member 35 is closely associated with the operating mechanism housing, the shaft comprising stem 32 may commonly be much longer in reaching to a remote point of control. Also, there typically is provided an indicating means whereby the operator may visually observe the movement of the valve toward an open or closed position. (In some cases, however, reliance may be placed solely on the resistance felt as the valve is opened or closed, in which case it is especially important that damage preventing means according to this invention be provided.)

Figures 5, 7, 12:
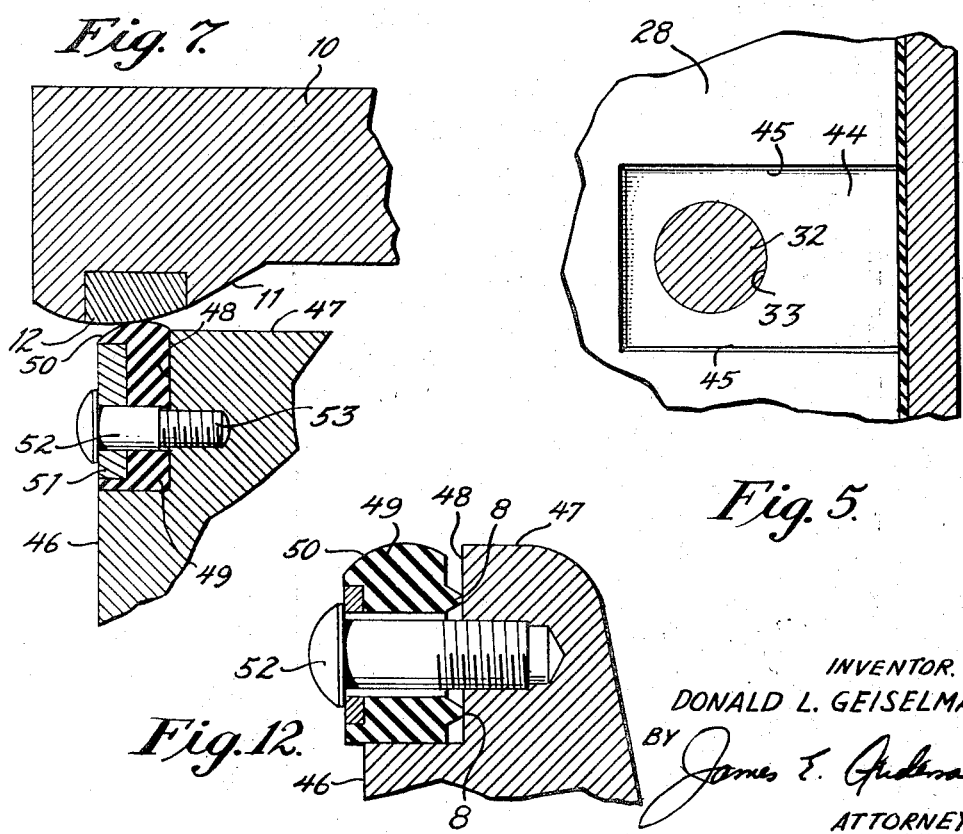
FIGURE 5 is a detail looking at the inside of an end wall of the housing taken as indicated by lines 5—5 in FIGURE 4.
FIGURE 7 is an enlarged cross-section of the vane periphery; the seat and the valve housing being an enlargement of the Area 7 of FIGURE 6.
FIGURE 12 is a sectional view showing the condition of the gasket before tightening of the clamping bolts to provide the seal between the gasket and the vane.

Referring to FIGURES 6 and 7, the vane V is shown as having a face 46, a circular periphery 47 and a notch-like recess 48 at its corner. Secured in the recess 48 is a rubber gasket 49 having a rounded outer edge at 50, which engages the seat ring 12 when the vane is in closed position, and having concentric ribs 9 on its inner vane-engaging face. A clamping means in the form of a ring 51 is embedded in the face of the gasket 49, and screws 52 pass through aligned openings in the plate 51 and gasket 49. The inner ends of the screws 52 are threaded at 53 for reception in tapped holes in the vanes V. The screw bolts 52 may be tightened just sufficiently to deform the ribs 8 to the extent necessary to provide a good seal between the gasket 49 and the face of the vane. Should it become necessary to achieve radial distortion of the gasket 49 so as to move any portion of the rounded edge 50 radially outwardly, the screw bolts 52 may be tightened further to the extent required.

While preferred specific embodiments of the invention are hereinbefore set forth, it is to be clearly understood that the invention is not to be limited to the exact constructions, mechanisms, and devices illustrated and described because the various modifications of these details may be provided in putting the invention into practice within the purview of the appended claims.

What is claimed is:

1. In a valve having a rotatable shaft for operating the valve between open and close positions, a valve operating mechanism for driving said shaft comprising a rigid housing associated with the valve, a lead screw journaled within said housing, driveable input means connected to said lead screw for rotating said lead screw when driven, a follower threaded on said lead screw, said follower being movable between limits longitudinally along the lead screw in response to rotation of said lead screw, means within said housing to prevent rotation of said follower during the course of its movement intermediate its travel limits, means establishing a driving connection between said valve shaft and follower, limit means incorporated in said housing at opposite ends of said follower to limit travel of the follower corresponding to positions wherein the valve is opened and closed, each end of said follower and its respective limit means having complementary interlocking configurations, whereby upon movement of the follower into mesh with said limit means at either end, rotation of the follower thereat is thereby prohibited and further torque imposed on said lead screw is opposed principally by said limit means and the housing.

2. The invention according to claim 1 in which said means to prevent intermediate rotation of said follower comprises means secured in a direction rotationally opposed to said lead screw and supported engaging opposite surfaces of said follower.

3. The invention according to claim 2 in which said means to prevent intermediate follower rotation comprises a bifurcated yoke secured to said valve shaft and having parallel spaced arms contiguously embracing opposite surfaces of said follower.

4. The invention according to claim 1, wherein said limit means comprises an irregular socket in opposite housing walls, and the follower has projections at its ends which interlock with said sockets.

5. The invention according to claim 4 in which said means to prevent intermediate rotation of said follower comprises means secured in a direction rotationally opposed to said lead screw and supported engaging opposite surfaces of said follower.

6. In a valve having a rotatable shaft for operating the valve between open and close positions, a valve operating mechanism for driving said shaft comprising a rigid housing associated with the valve, a lead screw journaled within said housing, driveable input means connected to said lead screw for rotating said lead screw when driven, a follower threadedly supported nonrotatably on said lead screw, said follower being movable longitudinally along the lead screw in response to rotation of said lead screw, means establishing a driving connection between said valve shaft and follower, said housing providing a wall opposite each corresponding end of said follower, each wall having a socket therein, and said follower having a projection engageable within the socket at each end of its travel to obstruct further travel in that direction and to prohibit rotation of the follower thereat, whereby further torque imposed on said lead screw is opposed principally by said housing.

7. The invention according to claim 6, wherein said sockets surround the ends of the lead screw at the locations of its bearings in the housing, and each end of the follower has an end configuration corresponding to the mutually interlocking parts of the sockets.

8. In a valve having a rotatable shaft for operating the valve between open and close positions, a valve operating mechanism for driving said shaft comprising a rigid housing associated with the valve, a lead screw journaled within said housing, driveable input means connected to said lead screw for rotating said lead screw when driven, a follower threaded on said lead screw, said follower being movable between limits longitudinally along the lead screw in response to rotation of said lead screw, means establishing a driving connection between said valve shaft and follower, and means to prevent rotation of said follower during the course of its movement intermediate its travel limits, said last recited means comprising a bifurcated yoke secured to said valve shaft and having parallel spaced arms contiguously embracing opposite surfaces of said follower.

References Cited

UNITED STATES PATENTS

| 3,147,766 | 9/1964 | Herring et al. | 74—89.15 XR |
| 3,037,397 | 6/1962 | Allen et al. | 74—424.8 |

H. T. KLINKSIEK, *Primary Examiner.*

U.S. Cl. X.R.

192—141; 74—89.15